May 7, 1935.  F. J. PEASE  2,000,668
ELECTRODE
Original Filed Dec. 22, 1930
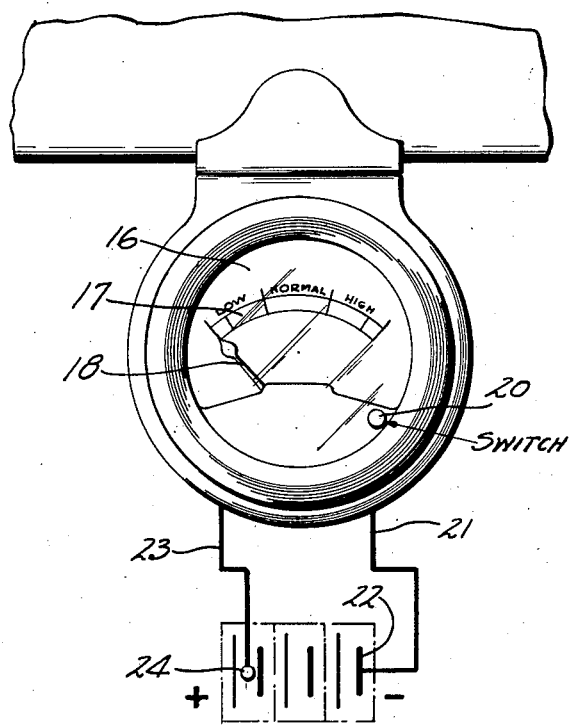
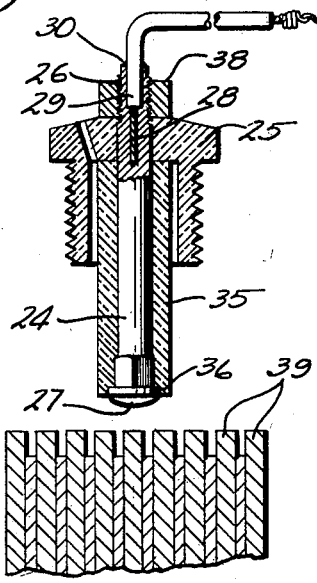
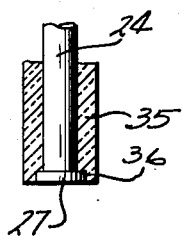
Inventor
Frederick J. Pease
By
Wheeler, Wheeler & Wheeler
Attorneys Patented May 7, 1935

2,000,668

UNITED STATES PATENT OFFICE 2,000,668

ELECTRODE

Frederick J. Pease, Wauwatosa, Wis., assignor to Clum Manufacturing Company, Milwaukee, Wis., a corporation of Wisconsin Original application December 22, 1930, Serial No. 503,963. Divided and this application January 7, 1932, Serial No. 585,190

4 Claims. (Cl. 136—182)

This invention relates to improvements in electrodes.

It is the primary purpose of this invention to provide a special electrode for storage batteries which may be incorporated in the closure plug of one cell of a multi-cell battery and so connected with a special indicating instrument as to show the state of charge of said battery through the use of current developed in the remaining cells.

So far as my improved device and circuit are concerned, the cell under test is not even a circuit energizing part of the battery, since it furnishes no current to the instrument. In effect, the resistance of the third cell is used as a variable multiplying voltage external to the cells which furnish energy to the instrument, and supplementing the internal resistance of the last mentioned cells as an index showing the state of charge of the battery as a whole, independently of other factors. A given cross section of the electrolyte affords, under stated conditions, a given amount of resistance. By limiting the exposed area of my special electrode to a predetermined extent, irrespective of changes of level in the electrolyte, I am able to measure the resistance of the electrolyte with laboratory precision, and to increase the variable portion of the total resistance of the circuit to such a degree as to give a wide range of deflection of the indicating instrument indicative of the characteristics of the battery which, from a practical standpoint, show its useful charge.

More specifically stated, it is an object of the invention to provide a special electrode having a predetermined limited area of substantially no vertical extent but nevertheless so devised that it will not retain upon its exposed face gas bubbles which might destroy its efficacy as a constant area electrode.

In the drawing:

Figure 1 is a front elevation of an instrument and a mounting bracket therefor, together with a diagrammatic illustration of the circuit in which such instrument is connected.

Figure 2 is an enlarged detail view in section, of a preferred form of electrode to be incorporated in the cell of the battery which affects the meter operation, the relation of the special electrode to the battery plates being indicated by a fragmentary illustration of the plates in section.

Figure 3 is a fragmentary detail of a modified form of electrode which will also give good results in the circuit shown in Figure 1.

Like parts are identified by the same reference characters throughout the several views.

The instrument preferably includes a dial 16 having a calibrated scale at 17 bearing suitable indications as to the relative state of the battery. The extreme ends of the scale indicative of over or under charge, are preferably colored red.

In the particular type of instrument shown, the dial 16 is stationary and a pointer at 18 moves across the calibrated scale when it is electromagnetically energized by the flow of current through the circuit hereinafter to be described. The instrument preferably includes a normally open switch, of which the button is shown at 20.

The instrument described is of standard construction with the exception of the electrical winding which is preferably designed to afford very little resistance as compared with other meters usually employed in battery testing circuits. It is because of this very low meter resistance that the switch is desirable, so that the circuit is normally open to avoid draining the battery. It is only by pressing button 20, thereby momentarily closing the circuit, that the pointer 18 is made to indicate battery condition.

The negative terminal of the instrument is connected directly by lead 21 with the negative plate 22 of the first battery cell. The second lead 23 connects the instrument with the special electrode 24 preferably incorporated in the last cell of the battery in spaced relation to the plates thereof. The arrangement is such that the energy of the cell in which electrode 24 is placed does not act as a source of energy upon the instrument.

The special electrode 24 is preferably mounted, or adapted to be mounted, in a closure cap 25 of a standard storage battery style, without interference with the vent usually provided in such caps. For this purpose the electrode 24 may comprise a rod, screw threaded at 26, and provided with a head 27 and a conductor 28 which is preferably fused to rod 24, avoiding necessity for the use of corrodible terminals. As a further precaution against corrosion, it is preferred that the conductor 28 have a rubber cover 29 extending well into the end of the electrode post 24. This may conveniently be done at the time the post is cast on to the end of conductor 28. If any crevice remains through which acid fumes might enter in a way to cause corrosion, the parts may be covered at 30 with an acid-proof paint or sealing wax or some like protective coating.

If, as is ordinarily the case, it is undesirable to use the special electrode as a means of developing potential in the cell under test, such electrode should be of the same composition as the input electrode of such cell which, in ordinary battery practice, is ninety per cent lead and ten per cent antimony.

Except from the standpoint of convenience, there is no advantage in introducing the special electrode through the closure cap into the cell, and it will also be obvious that unless the special electrode enters the cell at a point where it passes downwardly across the surface level of the electrolyte, there is no advantage in dielectrically sheathing the electrode.

The electrode is positioned, as well as insulated, by means of a dielectric bushing 35 which covers the whole length of the electrode except the outer face of its head portion 27. The bushing is preferably recessed at 36 to receive the head 27, leaving only the lower face thereof exposed. In order to avoid the possibility of gaseous accumulations on a horizontal surface, the head may be slightly convex as shown in Figure 2, the object being to get it as nearly horizontal as is practical. The exposed surface may also be absolutely horizontal as shown in Figure 3, but care should be taken that the bushing terminates flush with this surface, as any extension of the bushing below the level of the exposed surface of head 27 will trap gases formed electrolytically at the surface.

The electrode and its bushing are maintained in assembly with the filler cap 25 by means of a nut 38 threaded to the electrode and engaging the top of the cap. This nut is used to draw the parts tightly together and thereby to prevent the electrolyte from entering between the electrode and its insulating cushion.

Obviously, there would be no difference in principle if, instead of being made of a tube of bakelite or hard rubber, the bushing were cast of these materials, or of glass, or of any other suitable dielectric and acid-proof material directly upon the electrode. In any case, the bushing must be liquid-tight on the electrode to exclude the electrolyte from lateral contact therewith.

The length of the bushing 35 and electrode 24 will be such as to maintain the exposed face of the electrode in spaced relation to the battery plates 39, as shown in Figure 3.

It is particularly important in the circuit illustrated, and in conjunction with the type of indicating instrument above described, that the area of the special electrode which is exposed to the electrolyte should remain as nearly as possible a constant factor. It cannot be constant where the exposed area depends upon the degree to which the electrode is immersed in the electrolyte. Hence it is an important feature of the present invention that the electrode used is such that its exposed surface is substantially unaffected by changes of electrolyte level. In the particular device disclosed, this is ensured by sheathing the portion of the special electrode which passes through the surface of the electrolyte and disposing the exposed area substantially entirely at one level.

The sheathing performs two functions consisting first, in eliminating the effect of change of level of the electrolyte and thereby keeping constant the exposed area of the special electrode; and secondly, in predetermining said area. If the elctrode does not cross the surface of the electrolyte the first necessity for use of sheathing is eliminated, and the second desirable factor may be achieved otherwise by restricting the overall dimension of the portion of the special electrode within the cell.

The voltage of a storage battery is known to vary with the charge. In the ordinary battery the variation between full charge and discharge may be as much as one half volt per cell. In the circuit herein disclosed there is, therefore, a substantial variation in voltage in the two cells which are furnishing the current. As above pointed out, however, an instrument capable of showing this voltage with reasonable accuracy would have to be rather delicate and expensive instrument and would, moreover, only show the voltage instead of the effective charge of the battery as determined by temperature as well as voltage.

In my improved circuit the reading of the meter is partially attributable to the change of voltage in the cells furnishing the current (assuming that the current is derived from one or more cells of the battery under test) but the primary deflection of the needle of the instrument is achieved by reason of the variations of resistance of the electrolyte in the cell which is used as an index to the condition of the battery by insertion of the special electrode therein.

The exposed area of electrode 24 bears a very important relation to the characteristics of the indicating instrument. In order to obtain maximum deflection the resistance of the instrument and the external circuit in which it is incorporated should be low. A meter having a resistance of 1.1 ohms has been found satisfactory.

The electrolytic resistance of the cells furnishing the potential would of course vary in accordance with the charge of these cells, but this variation is negligible because of the enormous area of the plates in the ordinary battery. For example, a change in specific gravity from 1.28 to 1.1 would increase the resistance of one cubic inch of electrolyte by only one tenth of an ohm. The storage battery is designed to provide large plate area whereby the variation in resistance is decreased almost to the vanishing point.

The advantage of limiting the area of the special electrode used in the shunt circuit herein disclosed, is that by means of this limited area the area for transmission of current through the electrolyte is correspondingly reduced and may, for example, be of the order of one tenth of a square inch. With the variable factor so increased in resistance, the change of resistance noted between specific gravities of 1.28 and 1.1 in the electrolyte may represent a change from 1.6 ohms to 2.8 ohms. As compared with the low meter resistance of 1.1 ohms, this amount of variation in the electrolyte resistance is obviously capable of producing a great change in rate of current flow through the circuit, and a correspondingly great meter deflection.

In practice the current flowing through the instrument under the circumstances stated will vary from 1.55 amperes to 2 amperes. A change in the resistance of the indicating instrument would necessitate a corresponding change in the exposed area of the special electrode. Thus, the special electrode can be used as a means of adapting the circuit to many desired types and forms of indicating instruments.

This application is a division of my copending application Serial No. 503,963, filed Dec. 22, 1930.

I claim:

1. The combination with a closure plug for an electrolytic cell, said plug having an aperture through its top, of an electrode extending through said aperture and having one end threaded to receive a nut and the other end provided with a terminal head spaced from said plug, a dielectric sleeve on said electrode confined between said plug and head and extending from said plug top to a plane in which the margin of the end face of said head terminates in contact with said sleeve, and a nut on the threaded end of said electrode supported from said plug and holding said head in clamping engagement with said sleeve.

2. The combination with a closure plug for an electrolytic cell, said plug having an aperture through its top and a skirt surrounding said aperture to provide a recess of greater diameter than said aperture, of an electrode extending through said aperture and having one end threaded to receive a nut and the other end provided with a terminal head spaced from said plug, a dielectric sleeve on said electrode confined between said plug and head and spaced substantially concentrically from said skirt, said sleeve extending from the plug to a plane in which the margin of the end face of said head terminates in contact with said sleeve, and a nut on the threaded end of said electrode supported from said plug and holding said head in clamping engagement with said sleeve, said plug having a vent aperture communicating with the space between said sleeve and skirt.

3. The combination with a closure plug for an electrolytic cell having an aperture through its top, of a threaded electrode extending through the aperture and provided at a point remote from said plug with a head, a dielectric sleeve on said electrode counterbored to receive said head, leaving only its lower margin exposed and having a shoulder at the end of said counterbore against which said head bears, and a nut on the threaded end of said electrode bearing against said plug and thereby holding said head in clamping engagement with said sleeve.

4. The combination with an apertured closure plug for an electrolytic cell, of a tubular dielectric sheath registered with said aperture and projecting from said plug, an electrode headed for engagement with one end of said sheath and provided with a threaded portion projecting from said plug, and a nut on said threaded portion engaging said plug and thereby clamping the head of said electrode against said sheath in liquid-tight relation thereto, whereby to limit the exposure of said electrode to the portions of the head which are exposed beyond said sheath.

FREDERICK J. PEASE.